Patented Oct. 16, 1951

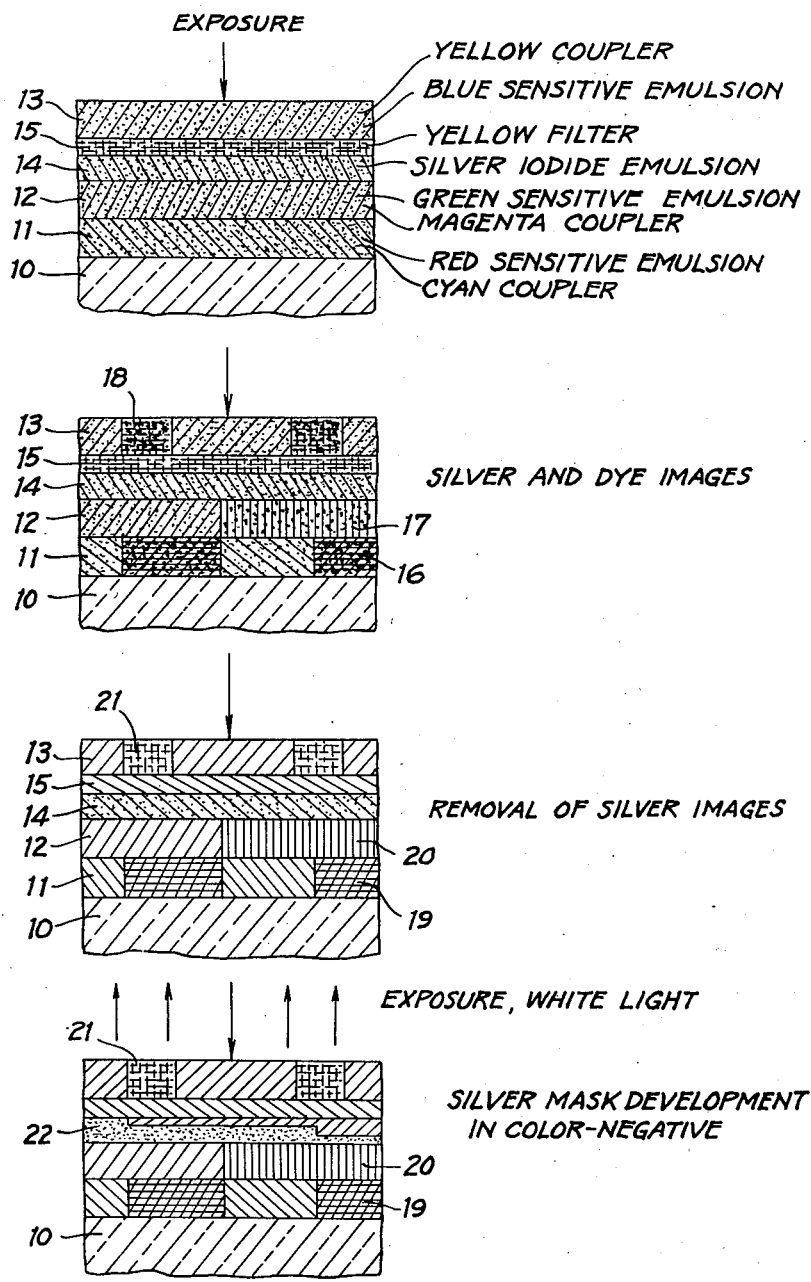

2,571,698

UNITED STATES PATENT OFFICE 2,571,698

PHOTOGRAPHIC MASKING PROCESS

Scheuring S. Fierke, Rochester, N. Y., assignor to Eastman Kodak Company, Rochester, N. Y., a corporation of New Jersey Application June 2, 1948, Serial No. 30,678

4 Claims. (Cl. 95—2)

This invention relates to color photography and in particular to methods for producing masking images for multi-layer color films.

It is well known that color prints made by uncorrected methods of photographic color reproduction suffer from degradation with more or less gray. This is due to the fact that some of the pigments or dyes used in the color print absorb light not only in the spectral regions which they are intended to absorb but also to some extent in other regions. According to the subtractive method of color photography, the color separation images are printed in colors complementary to the colors of the taking filters or the sensitivity of the emulsion layers. In three-color photography, the primary colors are considered to be red, green and blue and the color separation images obtained from these are printed respectively in blue-green, magenta and yellow colors. If theoretically accurate dyes could be obtained, these dyes should absorb only their complementary colors. The blue-green should absorb the red region of the spectrum and transmit the blue and the green regions. Similarly, the magenta dye should absorb the green region of the spectrum and transmit the blue and the red regions, and the yellow dye should absorb the blue region and transmit the red and the green regions.

Dyes have not yet been found for use in color photography which absorb only in the proper spectral regions. The blue-green dye usually absorbs not only in the red region but also to some extent in the green and the blue regions. The magenta dye absorbs not only in the green region but also in the blue and red regions. The yellow dye, on the other hand, is usually quite efficient, absorbing very little except in the blue and violet region.

As a result of the light absorption of the blue-green dye in the blue and green regions of the spectrum, certain corrections must be applied in printing, or a lower concentration of magenta or yellow dye must be used in the print in order to maintain a balance of color in the scale of grays. By using less magenta or yellow dye in the print than would otherwise be used, the gray scale balance is maintained by the blue-greens. Greens and blue of the print are degraded with gray and, therefore, are less luminous than they should be while magentas, yellows and reds are lacking in saturation, that is, are diluted by white.

In the preparation of color separation negatives or positives by printing from a colored original, such as a multi-color transparency, this degradation of colors may be overcome by the use of masks, that is, thin positives in the case of color separation negatives, which are registered with the color separation negative in making the print. When printing from a multi-color image on photographic film onto a similar multi-layer film, it is, of course, impossible to use separate masks for the different color separation records since they must be printed simultaneously onto the printing material. If a single mask is used, the registration difficulties are considerable and in the case of small-sized film, such as motion picture film, render this method of color correction impracticable.

Various methods have been set forth by the prior art, for producing masking images in an emulsion layer integral with a color film to be printed. Such methods surmount the difficulties of separate masking films.

A particular type of color film which requires masking images in order to compensate in printing for the dificiencies of the dye images therein, and for which integral masking is applicable, consists of three superimposed silver halide emulsion layers sensitized to the primary regions of the visible spectrum and containing coupler compounds for forming subtractively colored dye images in the layers by means of color-forming development. Such films and the method of preparation are described, for example, in the Jelley et al. U. S. Patent 2,322,027, granted June 15, 1943. These films may be used for recording the aspects of an original colored scene and customarily are used in negative-positive processes whereby they are color-developed to so-called "color negatives" in which the images appear in colors complementary to those of the original scene. The color negative is then printed onto a similar color film or paper and color-developed to images of the same color as the original scene. My invention relates to methods for producing integral masking images in color films of this type.

One object of my invention is to provide multi-layer color films containing integral masking emulsion layers of particular use in negative-positive processes. Another object is to provide methods for obtaining integral masking images in such films. Another object is to provide methods for obtaining color corrected prints from integrally masked color films particularly in negative-positive color processes. Other objects will become apparent from the following description of my invention.

These objects are accomplished, according to my invention, by incorporating between the blue-sensitive and green-sensitive layers of a multi-layer film or between the green-sensitive and red-sensitive layers, a silver iodide layer which is not exposed by the exposure of the regular image layers, and, after development of colored images in the regular emulsion layers, forming a masking image in the silver iodide layer by exposure through images in certain of the regular image layers.

In the accompanying drawings are shown in enlarged cross-sectional view, the appearance of one of the color films of my invention at various stages in the production of an integrally masked color-negative from which corrected prints may be obtained.

My process of producing an integral masking image in a color film is distinguished from prior art methods in part by utilizing a silver iodide emulsion layer for the masking layer. The advantages of using this type of emulsion layer instead of a silver chloride or bromide emulsion layer will become apparent from the following description of my invention as applied to a specific color film.

A multilayer color film is provided, constructed as shown in enlarged cross-sectional view in the first stage of the drawings, wherein a support 10 is coated with red, green and blue light-sensitive silver halide emulsion layers 11, 12 and 13 containing, respectively, cyan, magenta and yellow couplers, such as disclosed in the Jelley et al. U. S. Patent 2,322,027, dispersed in the emulsion layers by means of high boiling organic materials such as butyl phthalate. Metallic salt couplers may also be used such as described in Peterson U. S. Patents 2,353,754, granted July 18, 1944 and 2,296,306, granted September 22, 1942. Below the blue sensitive emulsion layer is a yellow filter layer 15 of yellow dye or colloidal silver, and under the yellow filter layer is the silver iodide masking emulsion layer 14 in which a masking image is to be produced. The film is placed in a camera and exposed to a suitable colored subject the result of which is to produce latent images in layers 11, 12 and 13 corresponding to red, green and blue light aspects of the scene. Following exposure, the film is developed in a color-forming developer of the following composition:

|  | Grams |
|---|---|
| 2-amino-5-diethylamino toluene-HCl | 2 |
| Sodium sulfite | 2 |
| Potassium bromide | 2 |
| Sodium carbonate (anhydrous) | 20 |
| Water to 1 liter. | |

The film now appears as shown in the second stage of the drawings wherein the emulsion layers 11, 12 and 13 contain silver and cyan, magenta and yellow dye images 16, 17 and 18, respectively. No image was formed in the masking emulsion layer because the color developer possesses too low energy for development of any latent image in the silver iodide. The film may next be treated in the following stop bath:

| Water, about 125° F | cc | 100 |
|---|---|---|
| Sodium sulfite | grams | 15 |
| Acetic acid, 28% | cc | 45 |
| Potassium alum | grams | 15 |
| Water to 1 liter. | | |

If desired sodium thiosulfate may be added to the above formula.

The film now containing negative silver and dye images is bleached in a bath of the following composition:

|  | Grams |
|---|---|
| Potassium ferricyanide | 50 |
| Potassium bromide | 20 |
| Water to 1 liter. | |

If desired, well-known dichromate or quinone-HCl baths may be used instead to convert the silver images to silver salt. The film is then fixed in a hypo bath such as the following:

| Water, about 125° F. (50° C.) | cc | 600 |
|---|---|---|
| Sodium thiosulfate (Hypo) | grams | 240.0 |
| Sodium sulfite, dessicated | do | 15.0 |
| Acetic acid, 28% | cc | 48.0 |
| Boric acid, crystals | grams | 7.5 |
| Potassium alum | do | 15.0 |
| Cold water to make 1.0 liter. | | |

The film now appears as shown in the third stage of the drawings according to which the silver images and silver halide having been removed from layers 11, 12 and 13, these layers now contain the cyan, magenta and yellow dye images 19, 20 and 21, respectively. The masking layer 14 may now be exposed through layers 11 and 12 but preferably is first sensitized by treatment of the film in a 5% sodium sulfite or sodium carbonate solution, following which an exposure is made with white light from the base side of the film, in order to form in the silver iodide layer 14 a record of the cyan and magenta images 19 and 20. The film is then developed in a high energy developer capable of reduction of silver iodide in the region of the exposure such as a developer having the formula:

| Water, about 90° F. (32° C.) | cc | 750 |
|---|---|---|
| Sodium sulfite, dessicated | grams | 90.0 |
| Hydroquinone | do | 45.0 |
| Sodium hydroxide | do | 37.5 |
| Potassium bromide | do | 30.0 |
| Water to make 1.0 liter. | | |

The film is next fixed in a bath of the following formula for removal of the residual silver halide in the film:

| Water (about 125° F.) | cc | 600 |
|---|---|---|
| Ammonium thiosulfate | grams | 100 |
| Sodium sulfite, dessicated | do | 15 |
| Acetic acid, 28% | cc | 48 |
| Boric acid | grams | 7.5 |
| Potassium alum | do | 15 |
| Water to 1 liter. | | |

The result is to obtain a silver image 22, in the masking emulsion layer which is a negative mask with respect to the dye images 19, 20, and 21 of the color-negative as shown in the last stage of the drawings.

The color-negative, now provided with a mask, may be printed onto a color film of structure similar to that shown in the first stage of the drawings and constructed as described in the Jelley et al. patent above, but not provided with the iodide layer 14 and generally the printing material has an opaque base such as paper. During printing exposure, the mask serves as do the usual silver color-correction masks to compensate for the improper light absorptions of the dyes of the process. Following color-development and removal of silver and residual silver halide from the printing material, there remains a picture which faithfully duplicates the colored scene originally photographed.

My invention is subject to a number of variations both as to the composition of the color film and the position of the silver iodide masking layer and the red, green and blue sensitive emulsion layers relative to one another. Similarly, variations may be made in the manner of obtaining and the composition of the masking image. That is, I contemplate as a part of my invention color films containing the iodide emulsion layer arranged as shown in the first stage of the drawings and in addition the layers may be coated in reverse order on the support, or layers 11 and 12 may be reversed relative to support 10. In all cases, the blue sensitive emulsion layer is arranged outermost relative to the green and red sensitive layers and a blue absorbing filter layer separates the blue sensitive layer from the red and green-sensitive layers.

The silver iodide emulsion layer can be positioned as shown in the drawings or alternately may be located between any two layers of the film, therefore, in certain cases, e. g. when positioned between layers 11 and 12, exposure of the masking layer will be made through only the cyan image-bearing layer and the resultant mask will only be a record of the cyan image. If the layers are arranged so the masking emulsion exposure is made through only the magenta image the mask is a similar record of only the magenta image. The silver iodide emulsion alternatively may be incorporated into the yellow filter layer 15 of the drawing and the masking image may be obtained in the layer in the same manner as described in detail previously.

It is not necessary that the masking image be composed only of silver. If desired, the image may be colored by well-known toning methods or may be obtained in color by means of color-forming development. The latter is accomplished by incorporating a coupler such as a yellow coupler into the silver iodide emulsion layer and adding color-developing agent to the high energy developer used for developing the mask. If desired, the coupler may be in the developer rather than in the masking emulsion layer. All of the advantages of colored masks may be realized if in addition to developing the masking image to color, the silver images obtained at the same time are subsequently removed by bleaching and fixing operations.

The advantages of my methods of producing a masking image which is an integral part of a multi-layer color film are now apparent. Contrary to similar prior art methods of producing masking images, the greater part of the processing steps can be carried out in white light thus allowing the professional photographer to follow the processing more readily. The silver iodide emulsion layer which is prepared very simply by reaction of silver nitrate with potassium iodide, does not readily fog in strong developers thus allowing considerable control of contrast and density of the mask by variations in processing time. No difficulty is encountered due to the effect of camera exposure on the silver iodide layer because even after prolonged exposure no silver is obtained in the layer during development in the low energy color developer. The quality and stability of the dye images of the film are improved since it is not necessary to use highly acid bleaching solutions to remove silver images. Such solutions have considerable effect upon the dyes of most color processes.

What I claim is:

1. The method of forming a masking image in a multilayer color film having three superposed silver halide emulsion layers sensitized respectively to the red, green and blue regions of the visible spectrum and containing coupler compounds for color-developing in said emulsion layers dye images of colors complementary to the sensitivities of said emulsion layers, the principal halide constituent of said layers being a halide other than silver iodide, the blue-sensitive layer being outermost, and a silver iodide emulsion layer between any two of said emulsion layers, which comprises exposing said film to a colored subject, developing silver and subtractively colored dye images in said red, green and blue-sensitive emulsion layers by means of a primary aromatic amino developing agent, removing said silver images and residual silver halide from said three emulsion layers, exposing said masking emulsion layer through a dye image other than the yellow dye image in said film, developing a masking image in said exposed masking emulsion layer and removing the residual silver halide from said film.

2. The method of forming a masking image in a multilayer color film having three superposed silver halide emulsion layers sensitized respectively to the red, green and blue regions of the visible spectrum and containing coupler compounds for color-developing in said emulsion layers dye images of colors complementary to the sensitivities of said emulsion layers, the principal halide constituent of said layers being a halide other than silver iodide, the blue-sensitive layer being outermost, and a silver iodide masking emulsion layer between the blue and green-sensitive emulsion layers, which comprises exposing said film to a colored subject, developing silver and subtractively colored dye images in said red, green and blue-sensitive emulsion layers by means of a primary aromatic amino developing agent, removing said silver images and residual silver halide from said three emulsion layers, exposing said masking emulsion layer through a dye image other than the yellow dye image in said film, developing a masking image in said exposed masking emulsion layer and removing the residual silver halide from said film.

3. The method of forming a masking image in a multi-layer color film having three superposed silver halide emulsion layers sensitized respectively to the red, green and blue regions of the visible spectrum and containing coupler compounds for color-developing in said emulsion layers dye images of colors complementary to the sensitivities of said emulsion layers, the principal halide constituent of said layers being a halide other than silver iodide, the blue-sensitive layer being outermost, and a silver iodide masking emulsion layer between the blue and red-sensitive emulsion layers, which comprises exposing said film to a colored subject, developing silver and subtractively colored dye images in said red, green and blue-sensitive emulsion layers by means of a primary aromatic amino developing agent, removing said silver images and residual silver halide from said three emulsion layers, exposing said masking emulsion layer through a dye image other than the yellow dye image in said film, developing a masking image in said exposed masking emulsion layer and removing the residual silver halide from said film.

4. The method of forming a masking image in a multilayer color film having three superposed silver halide emulsion layers sensitized respectively to the red, green and blue regions of the visible spectrum and containing coupler compounds for color-developing in said emulsion layers dye images of colors complementary to the sensitivities of said emulsion layers, the principal halide constituent of said layers being a halide other than silver iodide, the blue-sensitive layer being outermost, and a silver iodide masking emulsion layer between the red and green-sensitive emulsion layers, which comprises exposing said film to a colored subject, developing silver and subtractively colored dye images in said red, green and blue-sensitive emulsion layers by means of a primary aromatic amino developing agent, removing said silver images, exposing said masking emulsion layer through a dye image other than the yellow dye image in said film, developing a masking image in said exposed masking emulsion layer and removing the residual silver halide from said film.

SCHEURING S. FIERKE.

REFERENCES CITED

The following references are of record in the file of this patent:

UNITED STATES PATENTS

| Number | Name | Date |
|---|---|---|
| 1,905,188 | Sease | Apr. 25, 1933 |
| 2,186,849 | Wilmanns et al. | Jan. 9, 1940 |
| 2,258,187 | Mannes et al. | Oct. 7, 1941 |
| 2,327,764 | Carroll | Aug. 24, 1943 |

FOREIGN PATENTS

| Number | Country | Date |
|---|---|---|
| 473,993 | Great Britain | Oct. 25, 1937 |
| 555,699 | Great Britain | Sept. 2, 1943 |